United States Patent
Irisawa et al.

(10) Patent No.: US 7,785,675 B2
(45) Date of Patent: Aug. 31, 2010

(54) COMPOUND AND LIQUID CRYSTAL COMPOSITION

(75) Inventors: Masatomi Irisawa, Saitama (JP);
Tomohisa Miura, Saitama (JP);
Hirokatsu Shinano, Saitama (JP)

(73) Assignee: Adeka Corporation, Tokyo (JP)

( * ) Notice: Subject to any disclaimer, the term of this patent is extended or adjusted under 35 U.S.C. 154(b) by 206 days.

(21) Appl. No.: 11/921,892

(22) PCT Filed: Mar. 14, 2006

(86) PCT No.: PCT/JP2006/305025
§ 371 (c)(1),
(2), (4) Date: Dec. 10, 2007

(87) PCT Pub. No.: WO2006/132015
PCT Pub. Date: Dec. 14, 2006

(65) Prior Publication Data
US 2009/0103041 A1    Apr. 23, 2009

(30) Foreign Application Priority Data
Jun. 9, 2005 (JP) .............................. 2005-169480

(51) Int. Cl.
C09K 19/12 (2006.01)
C09K 19/20 (2006.01)
C09K 19/34 (2006.01)
C09K 19/30 (2006.01)
C07D 239/24 (2006.01)
C07D 319/06 (2006.01)
C07C 69/78 (2006.01)
C07C 43/172 (2006.01)
C07C 43/225 (2006.01)
C07C 25/24 (2006.01)

(52) U.S. Cl. .............. 428/1.1; 252/299.61; 252/299.63; 252/299.66; 252/299.67; 544/242; 549/369; 560/65; 568/631; 568/647; 570/128

(58) Field of Classification Search .................. 428/1.1; 252/299.61, 299.62, 299.63, 299.66, 299.67; 570/127, 128; 544/242; 549/369; 560/65; 568/631, 647
See application file for complete search history.

(56) References Cited

U.S. PATENT DOCUMENTS

| 4,330,426 | A | 5/1982 | Eidenschink et al. |
| 4,617,140 | A | 10/1986 | Eidenschink et al. |
| 5,122,295 | A | 6/1992 | Weber et al. |
| 5,403,512 | A * | 4/1995 | Bartmann et al. ...... 252/299.01 |
| 7,001,647 | B2 * | 2/2006 | Shinano et al. .............. 428/1.1 |
| 7,419,706 | B2 * | 9/2008 | Heckmeier et al. ............ 428/1.1 |
| 7,531,106 | B2 * | 5/2009 | Kirsch et al. ........... 252/299.01 |
| 2006/0263542 | A1 * | 11/2006 | Kirsch et al. .................. 428/1.1 |

FOREIGN PATENT DOCUMENTS

| EP | 1 577 286 | 9/2005 |
| GB | 2 270 913 | 3/1994 |
| JP | 55-040660 | 3/1980 |
| JP | 55-072143 | 5/1980 |
| JP | 56-012322 | 2/1981 |
| JP | 58-154532 | 9/1983 |
| JP | 58-177939 | 10/1983 |
| JP | 58-210045 | 12/1983 |
| JP | 59-078129 | 5/1984 |
| JP | 61-197563 | 9/1986 |
| JP | 01-503145 | 10/1989 |
| JP | 03-502942 | 7/1991 |
| JP | 06-500343 | 1/1994 |
| JP | 7-26254 | 1/1995 |
| JP | 10-067989 | 3/1998 |
| JP | 10-101598 | 4/1998 |
| JP | 10-139709 | 5/1998 |
| JP | 2005-154745 | 6/2005 |
| WO | WO 99/32722 | 7/1998 |
| WO | WO 02/06252 | 1/2002 |
| WO | 2004/058676 | 7/2004 |
| WO | WO 2005/019377 * | 3/2005 |
| WO | WO 2005019381 A1 * | 3/2005 |

OTHER PUBLICATIONS

United Kingdom Patent Office issued a U.K. Office Action dated May 18, 2009, Application No. GB0723847.0.

* cited by examiner

*Primary Examiner*—Shean C Wu
(74) *Attorney, Agent, or Firm*—Young & Thompson

(57) ABSTRACT

A compound represented by the following general formula (I).

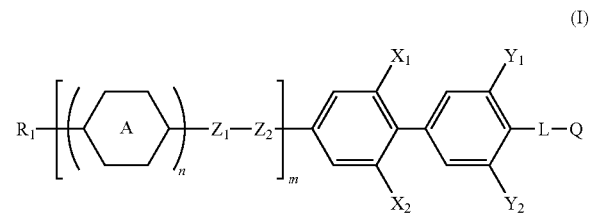

(In the formula, $R_1$ is hydrogen or $C_{1-8}$ alkyl; ring A is 1,4-phenylene, 1,4-trans-cyclohexylene, or 2,6-naphthylene; $Z_1$ and $Z_2$ each are —COO—, —OCO—, —CH$_2$O—, —OCH$_2$—, —CH$_2$CH$_2$—, —CH=CH—, —C≡C—, or a single bond; m is 1 or 2; n is 0 or 1; $X_1$ and $X_2$ each are $C_{1-3}$ alkyl or alkoxy or hydrogen, provided that when one of $X_1$ and $X_2$ is hydrogen, the other must not be hydrogen; $Y_1$ and $Y_2$ each are hydrogen, fluorine, or chlorine; Q is $C_{1-8}$ saturated or unsaturated alkyl in which all or part of the hydrogen atoms are replaced by a halogen atom; and L is oxygen atom or a single bond.)

3 Claims, No Drawings

COMPOUND AND LIQUID CRYSTAL COMPOSITION

TECHNICAL FIELD

The present invention relates to a specific novel compound with side-substitution and a liquid crystal composition comprising the same. The compound is useful as a liquid crystal compound and the liquid crystal composition is suitably used, especially, for electro-optical display elements.

BACKGROUND ART

Liquid crystal display elements, utilizing characteristics of liquid crystal compounds such as optical (refractive index) anisotropy ($\Delta n$; hereinafter, may simply be referred to as $\Delta n$) and dielectric anisotropy ($\Delta \in$; hereinafter, may simply be referred to as $\Delta \in$), have been manufactured in large quantities and are used for watches, clocks, electronic calculators, various measuring instruments, automotive instrument panels, word processors, electronic notebooks, portable telephones, printers, computers, television sets, and the like with demand increasing year by year. A liquid crystal compound has a specific liquid crystal phase between a solid phase and a liquid phase. The liquid crystal phase is classified broadly into nematic, smectic, and cholesteric phases, of which nematic phase is, at present, most widely used for liquid crystal display elements.

With regard to display and driving methods applied to liquid crystal displays, many modes have been devised. As display modes, there are known, for example, dynamic scattering (DS), guest-host (GH), twist nematic (TN), super twist nematic (STN), thin-film transistor (TFT), ferroelectric liquid crystal (FLC), polymer dispersed liquid crystal (PDLC) modes, and the like. As driving modes, there are known static, time-division, active matrix, dual frequency modes, and the like. Especially in the active matrix driving mode, the liquid crystal material is generally required to have high stability toward heat and light, and thus fluorinated compounds with superior stability are used as liquid crystal materials.

Liquid crystal display elements are required to exhibit various performances such as a wide operation temperature range, low operating voltage, fast response, high contrast ratio, wide viewing angle, chemical stability, and the like. At present, however, there is no material which can satisfy all these characteristics by itself. Therefore, a liquid crystal material and a non-liquid crystal material, each having one or more superior characteristics, are mixed together to provide a liquid crystal composition, wherein the components supplement each other to satisfy the various requirements. Thus, in developing a liquid-crystal or non-liquid crystal material, efforts are generally made to develop one which is excellent in one or more characteristics, not in all of them.

The performance items required for liquid-crystal display elements are low-power driving and fast response in battery-driven elements, high resolution and fast response in OA instruments, low-temperature response or fast response over a wide operation temperature range in displays for automobile, and the like. Thus, improvement in response speed is especially desired.

The response speed ($\tau$) is known to be proportional to the product of viscosity ($\eta$) of the liquid crystal material and square of the cell thickness (d). Namely, the following equation holds.

$$\tau \propto \eta d^2$$

Accordingly, fast response is achieved when a low-viscosity liquid crystal material is used and the cell thickness decreased. Especially, the effect of decrease in the cell thickness (d) is large. In decreasing the cell thickness, it is necessary to set the value of retardation [product of optical (refractive index) anisotropy ($\Delta n$) of the liquid crystal material and cell thickness (d)] within a certain range, the retardation being related to the contrast ratio of the liquid crystal display element. Thus, to decrease the cell thickness, a liquid crystal material with large $\Delta n$ becomes necessary. Namely, in order to achieve fast response, development of a liquid crystal material of low-viscosity and large $\Delta n$ is desired.

Further, the threshold voltage of a field effect-type liquid crystal display device, which uses a liquid crystal composition of positive dielectric anisotropy ($\Delta \in$), is generally known to be in reverse proportion to the square root of $\Delta \in$ of the composition. In recent years, in twist nematic (TN) liquid crystal elements, battery-driven types have become the main stream and liquid crystal materials, especially, of low threshold voltage are desired. For this purpose, liquid crystal materials with large and positive $\Delta \in$ are important.

Furthermore, low-temperature storage stability of a liquid-crystal material is usually evaluated from a standpoint of the lowest temperature at which the liquid crystal phase is exhibited. Thus, the lower that value is, the lower the temperature is at which the liquid crystal phase is exhibited. Especially when liquid crystal materials are used in cold regions, low-temperature storage stability is required.

Compounds having fluoroalkyl(oxy) end groups show positive dielectric anisotropy and are known as liquid crystal materials which exhibit high resistivity, high voltage holding ratio (VHR), low ionic density, and the like, which are required especially in the active matrix driving mode. Thus, attempts have been made to introduce a fluoroalkyl(oxy) group to compounds. For example, various compounds having fluoroalkyl groups are proposed in Patent Documents 1 to 9 and others. Also, in Patent Document 10 there is proposed an electro-optical display element utilizing a compound having a fluoroalkyl group and, further, in Patent Documents 11, and 12, and others there are proposed active matrix liquid crystal display elements using compounds having fluoroalkyl (oxy) groups, and others.

The present applicant proposed a compound having a fluoroallyloxy end group in Patent Document 13. The compound is a liquid crystal material having characteristics with low viscosity and high dielectric anisotropy ($\Delta \in$).

Patent Document 1: Japanese Patent Laid-Open Publication No. S55-72143

Patent Document 2: Japanese Patent Laid-Open Publication No. S55-40660

Patent Document 3: Japanese Patent Laid-Open Publication No. S61-197563

Patent Document 4: Japanese Patent Laid-Open Publication No. S56-12322

Patent Document 5: Japanese Patent Laid-Open Publication No. S58-154532

Patent Document 6: Japanese Patent Laid-Open Publication No. S58-177939

Patent Document 7: Japanese Patent Laid-Open Publication No. S58-210045

Patent Document 8: Japanese Patent Laid-Open Publication No. S59-78129

Patent Document 9: Japanese Patent Application Laid-Open No. H6-500343

Patent Document 10: Japanese Patent Application Laid-Open No. H1-503145

Patent Document 11: Japanese Patent Application Laid-Open No. H3-502942

Patent Document 12: Japanese Patent Laid-Open Publication No. H10-67989

Patent Document 13: International Publication No. WO2004/058676

DISCLOSURE OF THE INVENTION

Problems to be Solved by the Invention

However, the compounds having fluoroalkyl(oxy) groups specifically described in these documents did not show satisfactory performance with respect to optical (refractive index) anisotropy ($\Delta n$) and temperature ranges in which the liquid crystal phase is exhibited.

Accordingly, an object of the present invention is to provide a novel compound with high optical (refraction) anisotropy ($\Delta n$) and a wide temperature range of liquid crystal phase exhibition, which may be used as a liquid crystal material that can meet the fast response requirements.

Means for Solving the Problems

The present inventors conducted diligent studies and, as a result, found that a compound having an end group carrying side substituents can fulfill the above object.

The present invention has been made based on the above finding and provides a compound represented by the following general formula (I).

[Chemical 1]

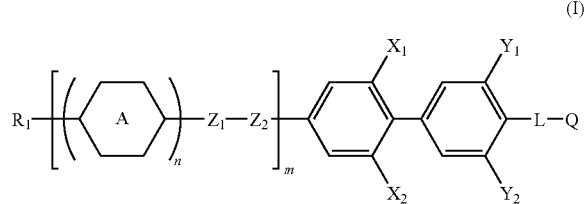

(I)

wherein $R_1$ is a hydrogen atom or an alkyl group having 1 to 8 carbon atoms, where the alkyl group may contain unsaturated bonds, any —$CH_2$— unit of the alkyl group may be replaced by —O—, —CO—, —COO—, or —$SiH_2$— and part or all of hydrogen atoms may be replaced by halogen atom or cyano group;

ring A is 1,4-phenylene (wherein —CH= may be replaced by —N=), unsubstituted 1,4-trans-cyclohexylene (wherein —$CH_2$— may be replaced by —O— or —S—), or 2,6-naphthylene group, and any hydrogen atom of ring A may be replaced by a halogen atom, a cyano, alkyl, or alkoxy group;

$Z_1$ and $Z_2$ are each independently —COO—, —OCO—, —$CH_2O$—, —$OCH_2$—, —$CH_2CH_2$—, —CH=CH—, —C≡C—, or a single bond, and any hydrogen atom of $Z_1$ and $Z_2$ may be replaced by a fluorine atom;

m is 1 or 2 and when m is 2, ring A, $Z_1$, and $Z_2$ that are repeated may be different, respectively;

n is 0 or 1;

$X_1$ and $X_2$ are each independently alkyl or alkoxy group with 1 to 3 carbon atoms, or a hydrogen atom, where if either $X_1$ or $X_2$ is hydrogen, the other must not be hydrogen;

$Y_1$ and $Y_2$ are each independently a hydrogen, fluorine, or chlorine atom;

Q is a saturated or unsaturated alkyl group having 1 to 8 carbon atoms, in which all or part of hydrogen atoms are replaced by halogen atoms; and L is an oxygen atom or a single bond.

The present invention also provides a liquid crystal composition comprising the compound.

Further, the present invention provides an electro-optical display element comprising a liquid crystal cell filled with the liquid crystal composition.

BEST MODE FOR CARRYING OUT THE INVENTION

First, the compound of the present invention will be described in more detail.

In the general formula (I), Q is a saturated or unsaturated $C_{1-8}$ alkyl (namely, alkyl, alkenyl, and alkynyl) group, in which all or part of the hydrogen atoms are replaced by halogen atoms such as fluorine, chlorine, bromine, iodine, and the like. Preferably, Q is a saturated or unsaturated $C_{1-8}$ alkyl group, in which all or part of hydrogen atoms are substituted with fluorine atoms. Preferred examples of a group represented by Q include monofluoromethyl, difluoromethyl, trifluoromethyl, 2,2,2-trifluoroethyl, 1,2,2-trifluoroethyl, 1,2,2-trifluorovinylmethoxymethyl, perfluroroethyl, perfluoropropyl, perfluoroallyl groups, and the like.

In the general formula (I), -L-Q is preferably the one represented by the following partial structure (II). Among the compounds of the present invention, use of compounds with -L-Q represented by partial structure (II) provides liquid crystal compositions of more lower viscosity with especially wide temperature ranges of liquid crystal phase exhibition.

[Chemical 2]

—O—$CF_2$—CF=$CF_2$    (II)

In the general formula (I), $R_1$ is a hydrogen atom or a $C_{1-8}$ alkyl group, where the alkyl group may contain unsaturation (namely, $R_1$ may be a $C_{1-8}$ alkenyl or alkynyl group). Further, any —$CH_2$— unit of the alkyl group may be replaced by —O—, —CO—, —COO—, or —$SiH_2$— and part or all of its hydrogen atoms may be replaced by halogen atoms such as fluorine, chlorine, bromine, iodine, and the like, or a cyano group.

Specific examples of a group represented by $R_1$ include methyl, monofluoromethyl, difluoromethyl, 2,2,2-trifluoromethyl, methoxymethyl, ethyl, propyl, methoxyethyl, ethoxymethyl, isopropyl, butyl, 1-methylpropyl, 2-methylpropyl, isobutyl, pentyl, hexyl, isohexyl, heptyl, octyl, isooctyl, 2-ethylhexyl, 2-propylpentyl, vinyl, perfluorovinyl, 1-methylethenyl, 2-methylethenyl, propenyl, allyl, butenyl, isobutenyl, pentenyl, hexenyl, heptenyl, octenyl groups, and the like.

Among these, unsubstituted alkyl or alkenyl groups such as methyl, ethyl, propyl, isopropyl, butyl, isobutyl, pentyl, hexyl, isohexyl, heptyl, octyl, isooctyl, 2-ethylhexyl, vinyl, 1-methylethenyl, 2-methylethenyl, propenyl, allyl, butenyl, isobutenyl, pentenyl, hexenyl, heptenyl, octenyl, and the like are preferable because they are chemically stable and non-polar. Further, especially preferable is a $C_{2-5}$ unsubstituted alkyl or alkenyl group, because it provides liquid crystal compositions with even wider temperature ranges wherein nematic phase is exhibited.

In the general formula (I), the ring A is a 1,4-phenylene group (wherein —CH= may be replaced by —N=), unsubstituted 1,4-trans-cyclohexylene group (wherein —$CH_2$— may be replaced by —O— or —S—), or 2,6-naphthylene, and any hydrogen atom of the ring A may be substituted with a halogen atom such as fluorine, chlorine, bromine, iodine, and the like, or a cyano, alkyl, or alkoxy group. As the alkyl group, $C_{1-3}$ alkyl groups such as methyl, ethyl, propyl, or isopropyl, and the like are preferably cited and as the alkoxy group, $C_{1-3}$ alkoxy groups such as methoxy, ethoxy, propoxy, isopropoxy and the like are preferably mentioned.

Specific examples of ring A include the cyclic groups described below but the present invention is not limited by these cyclic groups.

[Chemical 3]

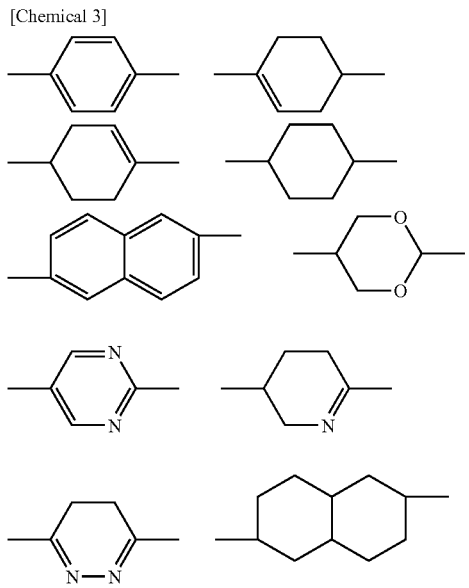

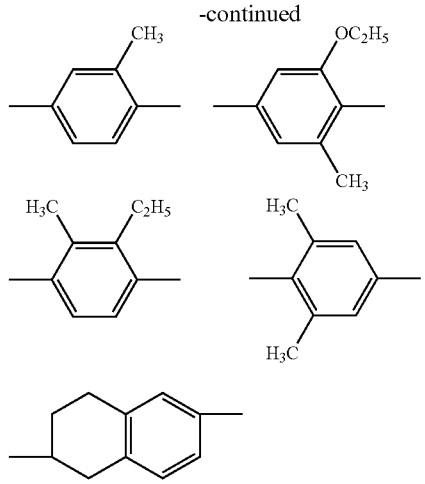

In the general formula (I), $X_1$ and $X_2$ are each independently a $C_{1-3}$ alkyl or alkoxy group, or a hydrogen atom, wherein when either $X_1$ or $X_2$ is a hydrogen atom, the other must not be hydrogen. Examples of the $C_{1-3}$ alkyl group represented by $X_1$ and $X_2$ include methyl, ethyl, propyl, and isopropyl groups, and those of the $C_{1-3}$ alkoxy group include methoxy, ethoxy, propoxy, and isopropoxy groups.

Preferable examples of the compound of the present invention include the following Compounds No. 1 to 24, but the present invention is not limited to these compounds. It is noted that $R_1$ in Compounds No. 1 to 24 is the same as that in the general formula (I).

[Chemical 4]

Compound No. 1

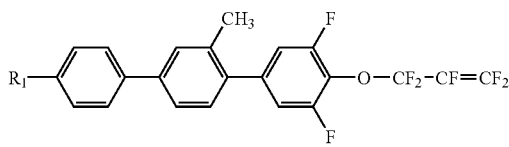

Compound No. 2

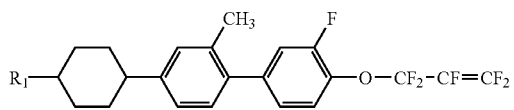

Compound No. 3

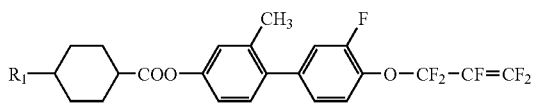

Compound No. 4

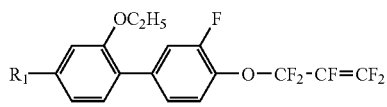

Compound No. 5

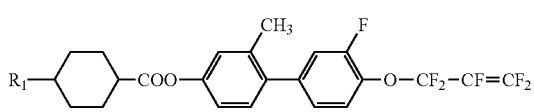

Compound No. 6

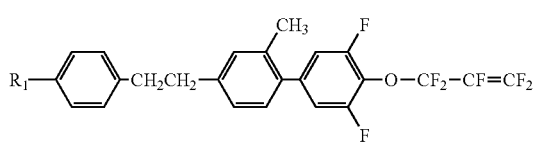

Compound No. 7

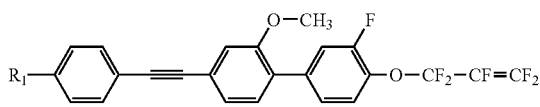

Compound No. 8

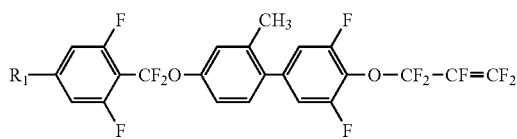

-continued
[Chemical 5]
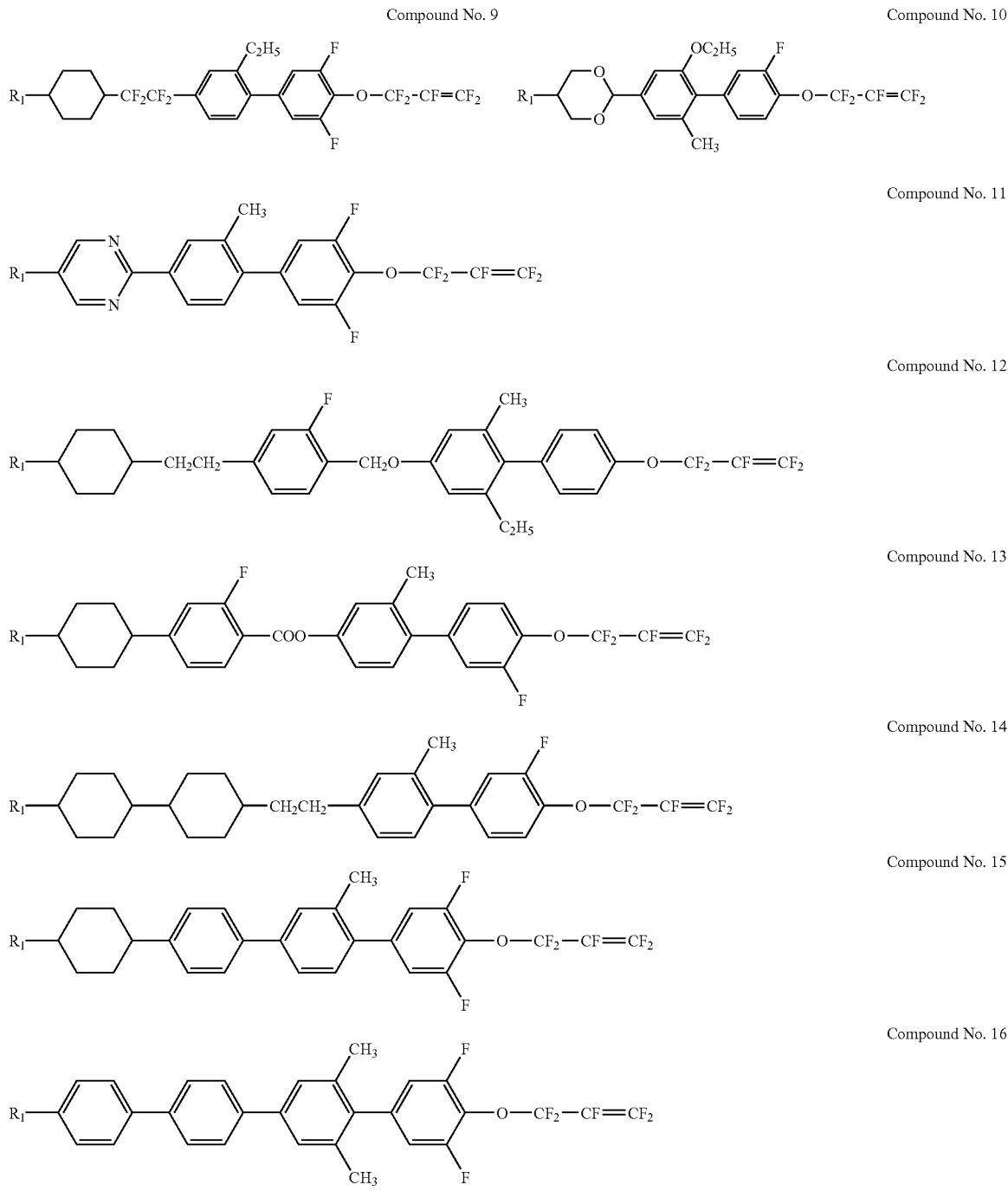
[Chemical 6]
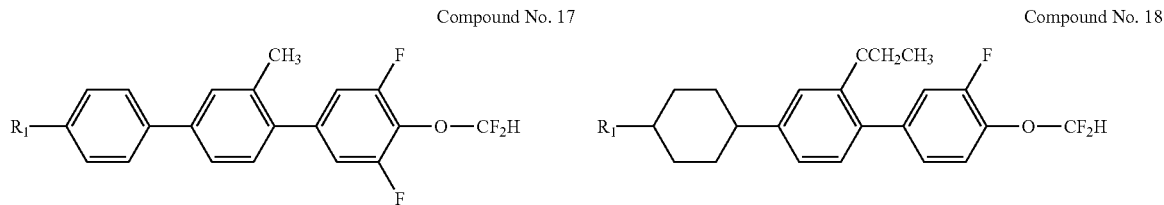

-continued

Compound No. 19

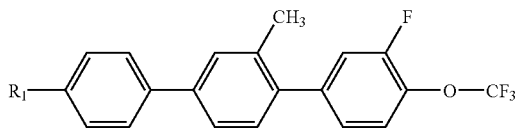

Compound No. 20

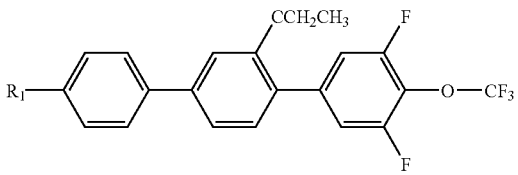

Compound No. 21

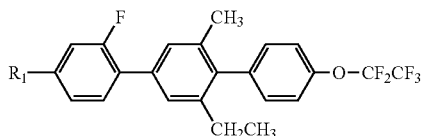

Compound No. 22

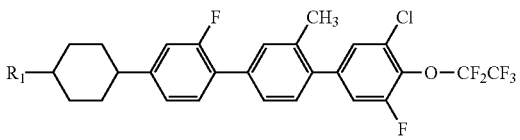

Compound No. 23

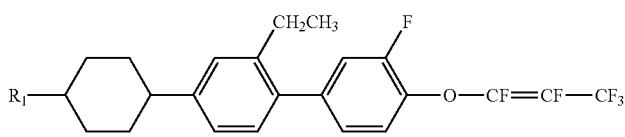

Compound No. 24

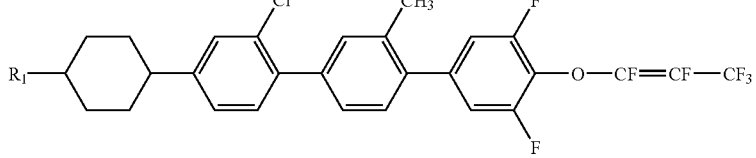

There is no restriction on the method of producing the compound of the present invention, but, for example, the compound having a -L-Q group represented by the preferred partial structure (II) may be prepared according to the reaction formula of [Chemical 7] below. Compounds having -L-Q groups other than the partial structure (II) may also be prepared following the reaction formula below and the reactions described later in the EXAMPLES section.

In the reaction formula of [Chemical 7], X in the perfluoro compound (2) represents iodine atom, bromine atom, monofluorosulfonic acid residue, and the like.

[Chemical 7]

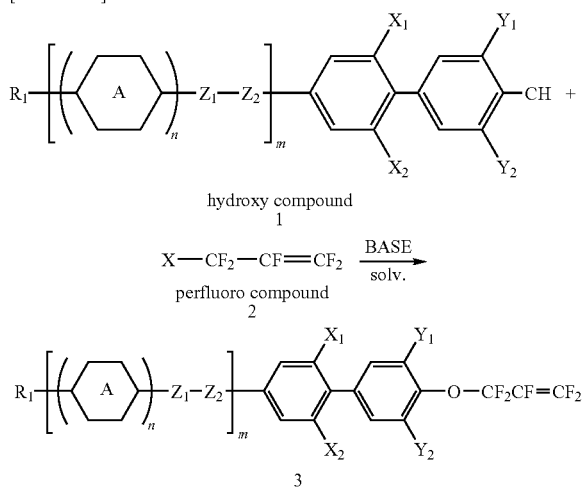

Here, the base (BASE) used in the above reaction include metal hydroxides such as sodium hydroxide and potassium hydroxide; metal hydrides such as lithium hydride and sodium hydride; amines such as triethylamine, ethyldimethylamine, propyldimethylamine, N,N'-dimethylpiperazine, pyridine, picoline, 1,8-diazabicyclo[5.4.0]undec-7-ene (DBU) benzyldimethylamine, 2-(dimethylaminoethyl)phenol (DMP-10), 2,4,6-tris(dimethylaminomethyl)phenol (DMP-30); and others.

Further, examples of the solvent (solv.) used in the above reaction include toluene, N,N-dimethylformamide (DMF), 1,3-dimethylimidazolidinone (DMI), tetrahydrofuran (THF), triethylamine, and the like.

The amounts of the hydroxy compound (1) and the perfluoro compound (2) used in the above reaction are in the mass ratio (the former:the latter) of preferably 20:1 to 1:20, and more preferably 1:1 to 1:10.

The amount of above-mentioned base used is preferably 0.1 to 5.0 mol %, more preferably 1.0 to 2.0 mol %, based on the hydroxy compound (1).

The solvent may be used in any desired amount but preferably the amount is suitably chosen in the range of 10 to 500 parts by mass based on 100 parts by mass of total of the hydroxy compound (1) and the perfluoro compound (2).

The compound of the present invention is useful as a liquid crystal compound and can be used in combination with a variety of other known liquid crystal or non-liquid crystal materials to provide liquid crystal compositions.

In the following, the liquid crystal composition and electro-optical display element of the present invention will be described in detail.

The liquid crystal composition of the present invention comprises the compound of the present invention, represented by the general formula (I), in any amount. The amount of the compound is preferably 1% or more by mass, especially 5% or more by mass. By incorporating the compound 1% or more by mass, an effect of increase in optical (refractive index) anisotropy (Δn) is surely attained and, further, the temperature range of liquid crystal phase exhibition is more widened. There is no upper limit to the amount of the compound of the present invention and, depending on the desired characteristics, the liquid-crystal composition may consist of the compound(s) of the present invention. However, when used in combination with various liquid crystal and/or non-liquid crystal materials known, the content of the compound of the present invention is preferably at maximum 30% by mass, in order to fully exert effects of using each material.

In the liquid crystal composition of the present invention, the kinds and amounts of the liquid crystal and or non-liquid crystal materials, to be used in combination with the compound of the present invention, are suitably chosen depending on the desired characteristic values such as torsion angle, pretilt angle, dielectric anisotropy (Δε), optical (refractive index) anisotropy (Δn), resistivity, temperature range of liquid crystal phase, viscosity, coefficient of rotational viscosity, average dielectric constant, voltage holding ratio, and the like, and depending on the kind of alignment layer used for the electro-optical display element wherein the liquid crystal composition is used, and others.

Examples of the liquid crystal or non-liquid crystal materials, which may be used for the liquid crystal composition of the present invention, include the compounds represented by the following general formula (III).

[Chemical 8]

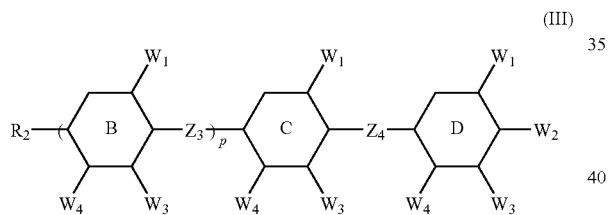

(III)

(In the formula, $R_2$ is a hydrogen atom or a $C_{1-8}$ alkyl, alkoxy, alkenyl, alkenyloxy, alkynyl, alkynyloxy, alkoxyalkyl, alkanoyloxy, or alkoxycarbonyl group which may be substituted with a halogen atom, a cyano group, or the like;

$W_2$ is a cyano group, a halogen atom, or any group recited above as $R_2$;

$W_1$, $W_3$ and $W_4$ are hydrogen atoms, halogen atoms, or cyano groups;

$Z_3$ and $Z_4$ are each independently a direct bond, —COO—, —OCO—, —CH$_2$O—, —OCH$_2$—, —CH$_2$CH$_2$—, —CH═CHCH$_2$O—, —CF$_2$O—, —OCF$_2$—, —CH$_2$CH$_2$COO—, —COO—CH$_2$CH$_2$—, —CH═CH—, or —C≡C—;

p is 0, 1, or 2;

rings B, C and D are each independently a benzene, cyclohexane, cyclohexene, pyrimidine, or dioxane ring.)

Specific examples of the compounds represented by the general formula (III) include the following structures in [Chemical 9], wherein the meanings of $R_2$, $W_1$, $W_2$, $W_3$ and $W_4$ are the same as those in the general formula (III).

[Chemical 9]

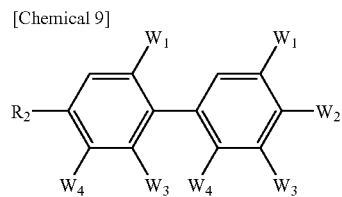

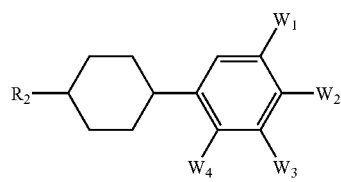

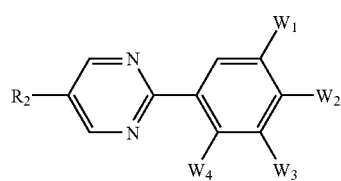

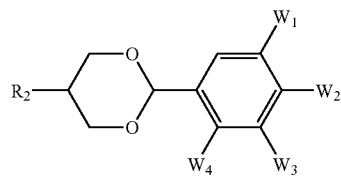

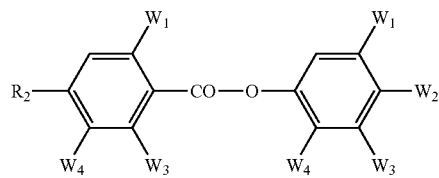

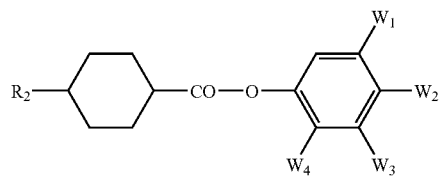

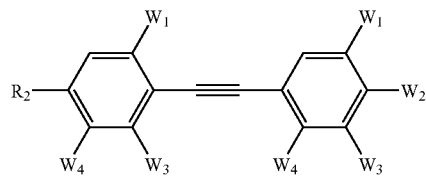

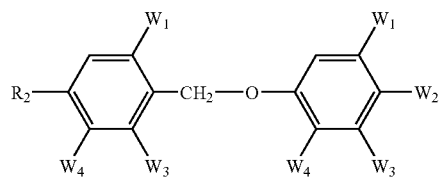

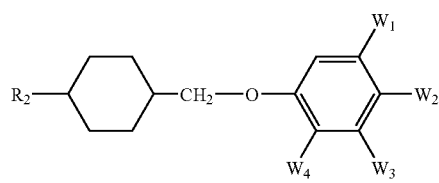

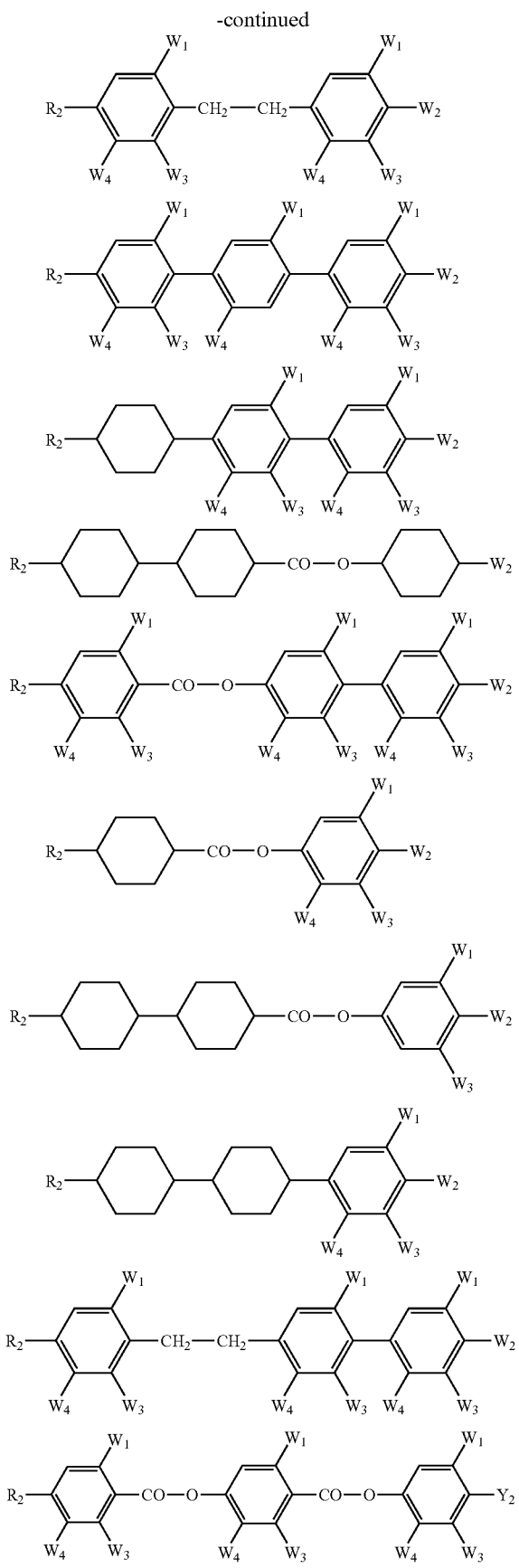
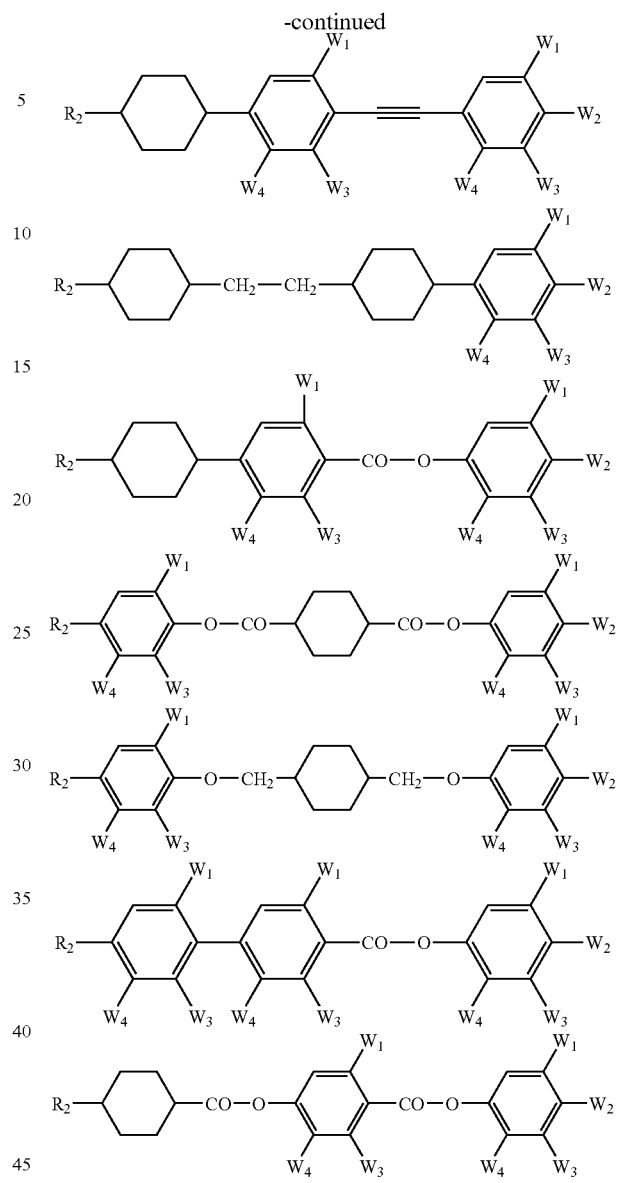

Further, known chiral agents may be used in combination with the liquid crystal composition of the present invention. Examples of the chiral agents include the compounds represented by the general formula (IV) of [Chemical 10], formula (V) of [Chemical 11], and the like.

[Chemical 10]

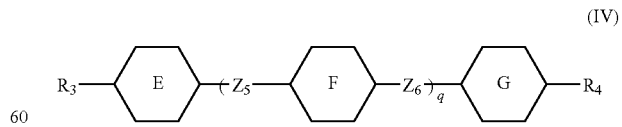

(In the formula, $R_3$ and $R_4$ are each independently alkyl, alkoxy, alkylcarbonylalkoxy, or alkoxycarbonyl group, which may be interrupted by ether bonds, may be substituted with halogen atoms and/or cyano groups, or may contain unsaturated groups;

the rings E, F, and G are each independently 1,4-phenylene, trans-1,4-cyclohexylene, or 2- or 3-fluoro-1,4-phenylene or -1,4-cyclohexenylene, which may be substituted with a halogen atom and/or a cyano group;

$Z_5$ and $Z_6$ are each independently —COO—, —OCO—, —CH$_2$CH$_2$—, —CH=CH—, —(CH$_2$)$_4$—, —CH$_2$O—, —OCH$_2$—, —(CH$_2$)$_3$O—, —O(CH$_2$)$_3$—, —CH=CHCH$_2$O—, —OCH$_2$CH=CH—, —C≡C—, —CF$_2$O—, —OCF$_2$—, —CFHCFH—, —CH$_2$CH$_2$COO—, —OCO—CH$_2$CH$_2$—, —CF$_2$—CF$_2$—, or a single bond;

q is 0, 1 or 2;

it is noted that, in the formula, there exists at least one chiral carbon atom.)

[Chemical 11]

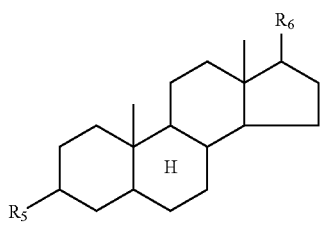

(V)

(In the formula, $R_5$ is a hydrogen or halogen atom; an alkyl, alkoxy, alkylcarbonyloxy, alkoxycarbonyl; aryl, aryloxy, arylcarbonyloxy or aryloxycabonyl group which may be substituted; or the like. Hydrogen atoms of these groups may be replaced by halogen atoms and ethylene groups may be replaced by ethenylene or ethynylene groups;

$R_6$ is an alkyl or alkenyl group;

ring H is a condensed ring which has only one double bond not shared with other rings, and may be substituted with an alkyl and/or alkoxy group.)

Examples of chiral agents include the following compounds.

[Chemical 12]

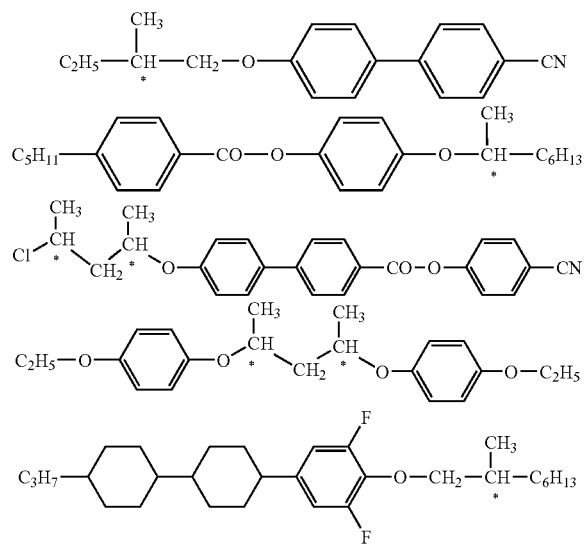

-continued

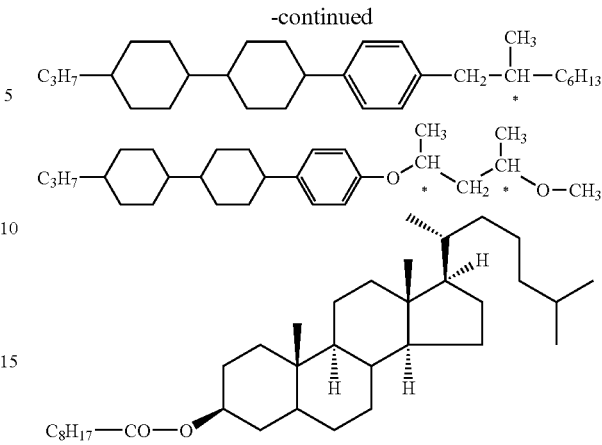

Further, chiral agents proposed in Japan Laid-Open Publication No. S63-175095, Japan Laid-Open Publication No. H1-242542, Japan Laid-Open Publication No. H1-258635, Japan Laid-Open Publication No. H6-200251, Japan Laid-Open Publication No. 2002-308833, and others may also be utilized.

These chiral agents may be used singly or in a combination of two or more kinds. In the latter case, a combination of chiral agents with the opposite twist direction as well as a combination of those with the same twist direction are possible. Also, as proposed in Japan Laid-Open Publication No. H7-258641, for example, a chiral agent, which effects a positive temperature dependency of rotational ability of the cholesteric phase, may be used in combination with another which effects a negative temperature dependency of the rotational ability of the cholesteric phase.

By changing the kind and concentration of the chiral agent used, the pitch of the liquid crystal composition may be adjusted. Preferably, the pitch is adjusted in the range of 0.2 to 300 μm.

Also, in order to provide the liquid crystal composition of the present invention with long-time stability against light and heat, there may be added ultraviolet light absorbers such as benzotriazole, benzophenone, triazine, benzoate, oxanilide, and cyanoacrylate types; hindered amine-type light stabilizers; antioxidants such as phenol, phosphorous, and sulfur types; and others.

Further, in order to impart antistatic properties, compounds such as surface active agents may be added to the liquid crystal composition of the present invention.

The compounds include those proposed in the Japanese Patent Laid-Open Publication No. S59-4676, Japanese Patent Laid-Open Publication No. H4-36384, Japanese Patent Laid-Open Publication No. H4-180993, Japanese Patent Laid-Open Publication No. H11-212070, Japanese Patent Laid-Open Publication No. H8-337779, Japanese Patent Laid-Open Publication No. H9-67577, and Japanese Patent Laid-Open Publication No. 2003-342580, and others.

The liquid crystal composition of the present invention may suitably be used, especially, for electro-optical displays elements.

The liquid crystal composition of the present invention may be filled in the liquid crystal cells and fabricated into various electro-optical display elements. The electro-optical display element of the present invention comprising a liquid crystal cell filled with the liquid crystal composition of the present invention is the same as the conventional electro-optical display element, except that the crystal liquid composition used in the former is the liquid crystal composition of the present invention. To the electro-optical display elements of the present invention, various display modes may be applied, including, for example, dynamic scattering (DS), guest-host (GH), twist nematic (TN), super twist nematic (STN), thin-film transistor (TFT), thin-film diode (TFD), ferroelectric liquid crystal (FLC), antiferroelectric liquid crystal (AFLC), polymer dispersed liquid crystal (PDLC), vertical alignment (VA), in-plane switching (IPS), cholesteric-nematic phase transition modes, and the like. Various driving modes may also be applied, including static, time-division, active-matrix, dual frequency modes, and the like.

The electro-optical display elements comprising the liquid crystal composition of the present invention may be used for watches, clocks, electronic calculators, measuring instruments, automotive instruments, copying machines, cameras, OA instruments, portable personal computers, portable telephones, and the like. Also, there are other uses such as photochromic windows, light-shielding shutters, polarization converters, and the like. Particularly, based on the characteristics, the elements are suitably used for monitors with large display areas, wide-screen television sets, PDA, portable personal computers, portable telephones, and the like.

Further, electro-optical elements or liquid crystal composition used therefor are proposed in the following documents, and the compound of the present invention may be used in combination with the electro-optical elements or liquid crystal compositions proposed therein:

Japanese Patent Laid-Open Publication No. H10-67989, Japanese Patent Application Laid-Open No. H3-502942, Japanese Patent Laid-Open Publication No. H3-85532, Japanese Patent Laid-Open Publication No. H 4-296387, Japanese Patent Application Laid-Open No. H6-501517, Japanese Patent Application Laid-Open No. H10-512914, Japanese Patent Laid-Open Publication No. H9-125063, Japanese Patent Laid-Open Publication No. H11-29771, Japanese Patent Laid-Open Publication No. H10-245559, Japanese Patent Laid-Open Publication No. 2000-351972, Japanese Patent Laid-Open Publication No. 2002-285157, Japanese Patent Laid-Open Publication No. 2002-302673, Japanese Patent Application Laid-Open No. 2002-533526, Japanese Patent Laid-Open Publication No. 2002-114978, Japanese Patent Application Laid-Open No. H5-501735, Japanese Patent Laid-Open Publication No. 2002-193853, Japanese Patent Laid-Open Publication No. 2002-193852, Japanese Patent Application Laid-Open No. H5-500683, Japanese Patent Laid-Open Publication No. 2002-201474, Japanese Patent Laid-Open Publication No. H10-204016, Japanese Patent Laid-Open Publication No. 2000-73062, Japanese Patent Laid-Open Publication No. 2000-96056, Japanese Patent Laid-Open Publication No. 2001-31971, Japanese Patent Laid-Open Publication No. 2000-80371, Japanese Patent Laid-Open Publication No. 2001-354967, Japanese Patent Laid-Open Publication No. 2000-351972, International Publication No. WO99/21815, International Publication No. WO99/21816, International Publication No. WO97/36847, U.S. Pat. No. 5,456,860, U.S. Pat. No. 5,578,241, Eur. Pat. No. 662502, Ger. Pat. No. 10117224.

EXAMPLES

Hereafter, the present invention will be further detailed with Examples. However, the present invention is not limited by Examples.

Example 1

Production of Compound No. 1 ($R_1$=n-$C_3H_7$)

Compound No. 1 was synthesized according to the reaction formula of [Chemical 13] below, by the following Steps 1 to 4.

[Chemical 13]

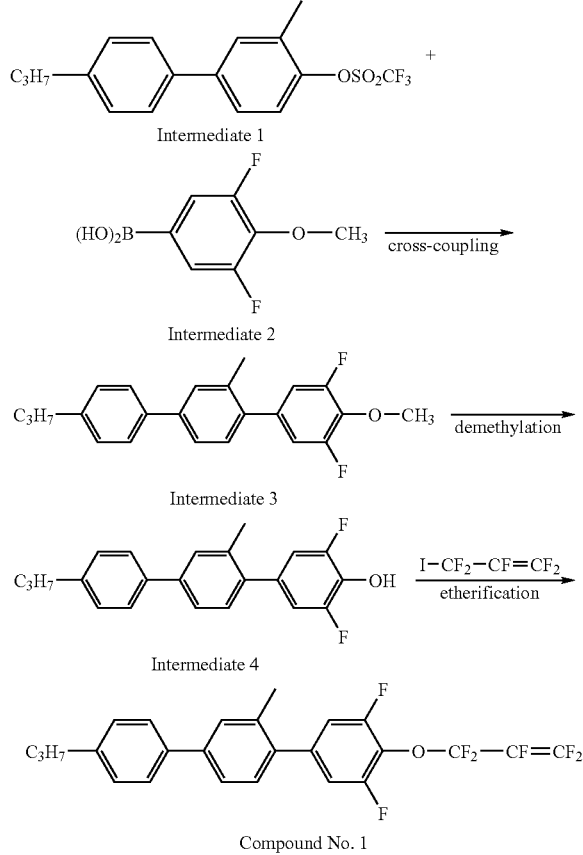

<Step 1> Synthesis of Intermediate 1

Intermediate 1 was synthesized according to the reaction formula of [Chemical 14] below, by the following procedure.

[Chemical 14]

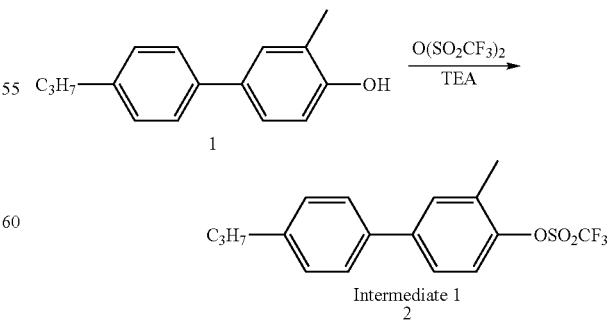

There were charged 5.4 g (23.9 mmol) of 3-methyl-4'-propyl-[1,1'-biphenyl]-4-ol (1), 7.2 g (71.5 mmol) of triethylamine (TEA), and 27 g of dichloromethane and to this was added dropwise 7.4 g (26.2 mmol) of trifluoromethane-sulfonic anhydride at −15° C. After addition, the mixture was stirred for 1 hour. After being allowed to warm to room temperature, aqueous hydrochloric acid and dichloromethane were added and the resultant mixture was stirred and separated. The organic layer was washed with aqueous sodium bicarbonate and, after neutralization, dried with magnesium sulfate to give 8.1 g of brown liquid crystals. The brown liquid crystals were purified by column chromatography on silica gel (eluent: hexane/ethyl acetate) to give 7.6 g of a yellow, transparent liquid (yield 58.8%, purity 99.8%). The yellow, transparent liquid obtained was confirmed as the desired Intermediate 1: 3-methyl-4'-propyl-[1,1'-biphenyl]-4-trifluoromethylsulfonate (2).

<Step 2> Synthesis of Intermediate 3
(Cross-Coupling)

Intermediate 3 was synthesized according to the reaction formula of [Chemical 15] below, by the following procedure.

[Chemical 15]

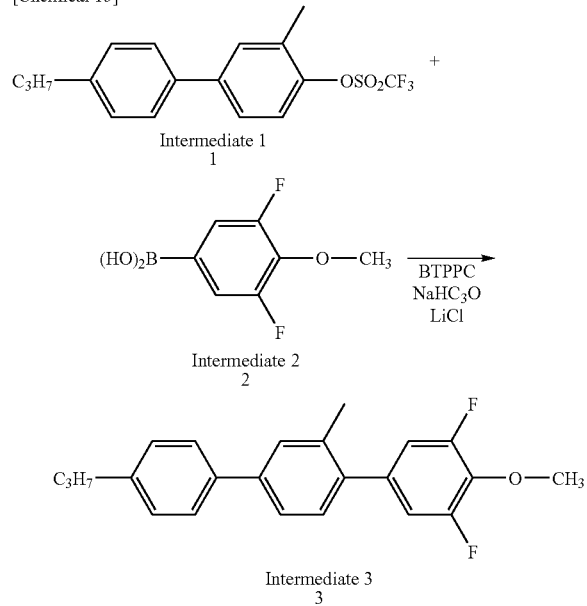

Under nitrogen flow, 7.6 g (21 mmol) of Intermediate 1: 3-methyl-4'-propyl-[1,1'-biphenyl]4-trifluoromethane-sulfonate, 4.3 g (23.1 mmol) of Intermediate 2: 2,4-difluoro-3-methoxyphenylboronic acid, 7.1 g (83.9 mmol) of sodium bicarbonate, 0.15 g (0.21 mmol) of BTPPC [palladium catalyst; bis(triphenylphosphine)palladium dichloride], 2.7 g (63 mmol) of LiCl, 20 g of 1,4-dioxane, and 20 g of water were charged and the mixture was reacted at 80° C. for 8 hours. After the reaction mixture was allowed to cool to room temperature, aqueous hydrochloric acid and ethyl acetate were added and the resultant mixture was stirred and separated into layers. The organic layer was washed with saturated aqueous sodium chloride and neutralized. The organic layer was dried with magnesium sulfate to obtain 7.8 g of an oily liquid. This oily liquid was purified by column chromatography on silica gel (eluent: hexane/ethyl acetate) to give 7.0 g (yield 92.2%, purity 98%) of a yellowish-white, transparent, and viscous liquid. This yellowish-white, transparent, and viscous liquid was confirmed as the desired Intermediate 3: 3,5-difluoro-2'-methyl-4-methoxy-4"-propyl-[1,1':4', 1"-terphenyl] (3).

<Step 3> Synthesis of Intermediate 4
(Demethylation)

Intermediate 4 was synthesized according to the reaction formula of [Chemical 16] below, by the following procedure.

[Chemical 16]

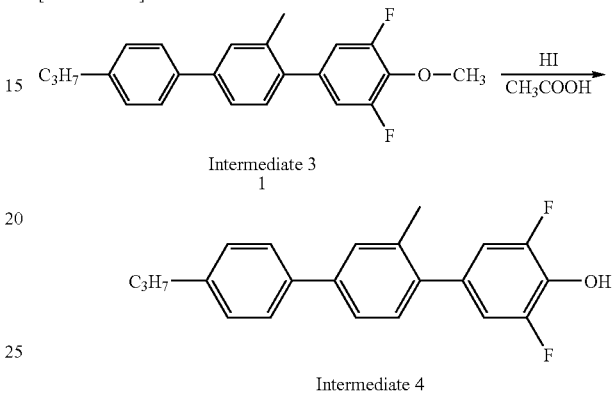

Under nitrogen flow, 7.0 g (19.4 mmol) of intermediate 3: 3,5-difluoro-2'-methyl-4-methoxy-4"-propyl-[1,1':4',1"-terphenyl] (1), 11.9 g (48.4 mmol) of 52% by mass hydroiodic acid aqueous solution, and 32.8 g (546 mmol) of acetic acid were charged and the mixture was stirred under heating, while generated CH₃I being distilled off. After reacting at 110° C. for 3 hours, toluene and ethyl acetate were added, and the resultant mixture was stirred, and separated into layers. The organic layer obtained was washed with saturated aqueous sodium chloride and dried with magnesium sulfate to give 7.1 g of an oily substance. This oily substance was purified by column chromatography on silica gel (eluent: hexane/ethyl acetate) to give 6.3 g of a white powder (yield 96.2%, purity 98.8%). This was confirmed as the desired Intermediate 4: 3,5-difluoro-2'-methyl-4"-propyl-[1,1':4',1"-terphenyl]-4-ol (2).

<Step 4> Synthesis of Compound No. 1

According to the reaction formula of [Chemical 17] below, the final product, Compound No. 1 was synthesized by the following procedure.

[Chemical 17]

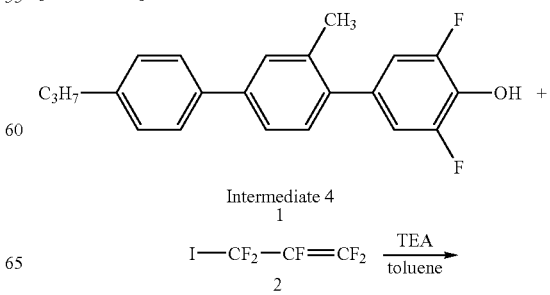

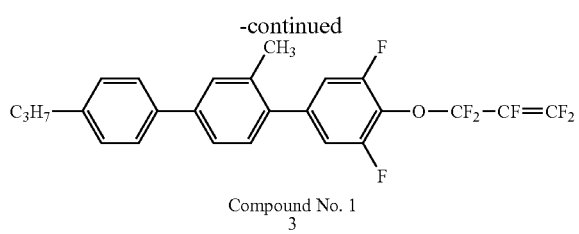

Compound No. 1

Under nitrogen flow, 6.0 g (17.6 mmol) of Intermediate 4: 3,5-difluoro-2'-methyl-4''-propyl-[1,1':4',1''-terphenyl]-4-ol (1), 18 g of toluene and 2.2 g (22 mmol) of triethylamine (TEA) were charged and to the resultant mixture was added 5.0 g (19.4 mmol) of 3-iodopentafluoroprop-1-ene (2) dropwise at 0° C. or lower. The reaction was continued for 1 hour under stirring. After the reaction, aqueous hydrochloric acid was added to the reaction mixture and the layers were separated. The organic layer obtained was washed with saturated aqueous sodium chloride, neutralized, and dried with magnesium sulfate. After filtration and concentration, 7.9 g of a yellow, transparent liquid was obtained. This yellow, transparent liquid was purified by column-chromatography on silica gel. The purified solution was subjected to recrystallization (solvent: ethanol) to give 6.0 g of white crystals (yield 72.6%, purity 100%).

The white crystals obtained were, as a result of analysis by infrared absorption spectrum (IR) and $^1$H-NMR, confirmed as the desired Compound No. 1 ($R_1$=n—$C_3H_7$): 3,5-difluoro-2'-methyl-4''-propyl-[1,1':4',1''-terphenyl]-4-(oxypentafluoroprop-1-ene) (3). The results of analysis and phase-transition temperature measurement are shown below.

(Analytical Results)

(1) IR (cm$^{-1}$)

2963, 2932, 2874, 1790, 1601, 1489, 1431, 1385, 1319, 1231, 1018, 910, 868, 822, 745, 714, 675, 656, 625, 590, 536

(2) $^1$H-NMR (ppm)

7.75-6.90 (m; 9H), 2.78-2.56 (t; 2H), 2.34 (s; 1H), 1.89-1.48 (m; 2H), 1.11-0.89 (t; 3H)

(3) Phase-transition temperature

The phase-transition temperature of this compound was observed by a polarized-light microscope to give the results below.

[Chemical 18]

$$C \xrightarrow{35.2°\,C.} I$$
$$\searrow 33.3°\,C.$$
$$N$$

(C: crystal, I: isotropic phase, N: nematic phase)

Example 2 and Comparative Example 1

Using Compound No. 1 obtained in Example 1, a liquid crystal composition was prepared according to the mixing ratio listed in Table 1 and its optical (refractive index) anisotropy and low temperature storage stability were measured. The results are shown in [Table 1] below.

TABLE 1

| Liquid crystal compund | Amount (parts by mass) | |
| --- | --- | --- |
| | Comparative Example 1 | Example 2 |
| H$_7$C$_3$—⬡—⌬—O—CF$_2$CF=CF$_2$ | 32 | 32 |
| H$_9$C$_4$—⬡—⌬—O—CF$_2$CF=CF$_2$ | 6 | 6 |
| H$_5$C$_2$—⬡—⬡—⌬(F)—O—CF$_2$CF=CF$_2$ | 11 | 11 |
| H$_7$C$_3$—⬡—⬡—⌬(F)—O—CF$_2$CF=CF$_2$ | 13 | 13 |
| H$_7$C$_3$—⬡—⬡—⌬(F,F)—O—CF$_2$CF=CF$_2$ | 17 | 17 |

TABLE 1-continued

| | Amount (parts by mass) | |
|---|---|---|
| Liquid crystal compund | Comparative Example 1 | Example 2 |
| 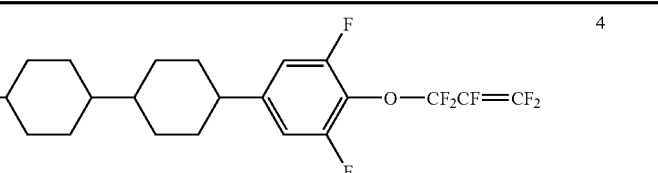 | 4 | 4 |
| 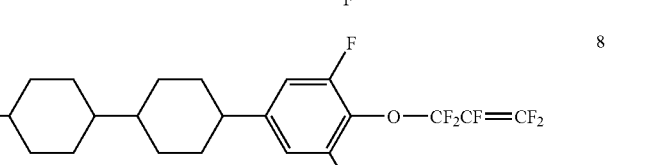 | 8 | 8 |
| 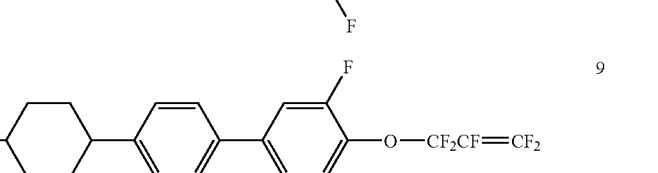 (Comparative compound 1) | 9 | |
| 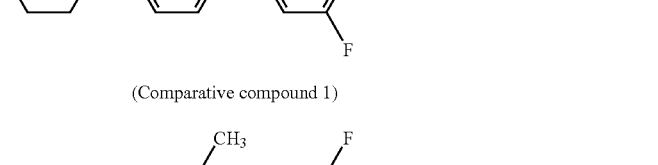 (Compound No. 1) | | 9 |
| Δn | 0.088 | 0.090 |
| Low-temperature storage stability | −30 | −40 |

Δn: optical (refractive index) anisotropy (25° C., 589 nm)
Low-temperature storage stability: the lowest temperature at which no change was observed in a screw vial for 2 weeks. Unit: [° C.]

As is clear from Table 1, the liquid crystal composition containing the compound of the present invention has a larger value of the optical (refractive index) anisotropy (Δn), and better low-temperature storage stability, in comparison to the liquid crystal composition containing the comparative compound.

Example 3 and Comparative Example 2

Using the Compound No. 1 obtained in Example 1, a liquid crystal composition was prepared according to the mixing ratio listed in Table 2 and its optical (refractive index) anisotropy and low-temperature storage stability were measured. The results are shown in [Table 2] below.

TABLE 2

| | Amount (parts by mass) | |
|---|---|---|
| Liquid crystal compound | Comparative Example 2 | Example 3 |
|  | 13 | 13 |

TABLE 2-continued

| Liquid crystal compound | Amount (parts by mass) Comparative Example 2 | Example 3 |
|---|---|---|
| H₇C₃–[Cy]–[Ph(F,F)]–C(=O)O–[Ph(F,F)]–O–CF₂CF=CF₂ | 9 | 9 |
| CH₂=CH–[Cy]–[Cy]–[Ph(F,F)]–O–CF₂CF=CF₂ | 7 | 7 |
| CH₂=CH–[Cy]–[Cy]–[Ph(F)]–O–CF₂CF=CF₂ | 18 | 18 |
| H₇C₃–[Cy]–[Ph]–O–CF₂CF=CF₂ | 33 | 33 |
| H₇C₃–[Cy]–[Ph(F)]–O–CF₂CF=CF₂ | 6 | 6 |
| H₇C₃–[Cy]–[Cy]–[Ph(F,F)]–O–CF₂CF=CF₂ | 8 | 8 |
| H₇C₃–[Cy]–[Ph]–[Ph(F,F)]–O–CF₂CF=CF₂ (Comparative compound 1) | 6 | |
| H₇C₃–[Ph]–[Ph(CH₃)]–[Ph(F,F)]–O–CF₂CF=CF₂ (Compound No. 1) | | 6 |
| Δn | 0.094 | 0.095 |
| Low-temperature storage stability | −20 | −30 |

Δn: optical (refractive) anisotropy (25° C., 589 nm)
Low-temperature storage stability: the lowest temperature at which no change was observed in a screw vial for 2 weeks. Unit: [° C.]

As is clear from Table 2, the liquid crystal composition containing the compound of the present invention has a larger value of the optical (refractive index) anisotropy (Δn) and better low-temperature storage stability in comparison to the liquid crystal composition containing the comparative compound.

Example 4 and Comparative Example 3

Using the Compound No. 1 obtained in Example 1, a liquid crystal composition was prepared according to the mixing ratio listed in Table 3 and its optical (refractive index) anisotropy, low-temperature storage stability, nematic-isotropic phase transition temperature, and dielectric anisotropy were measured. The results are shown in [Table 3] below.

TABLE 3

| Liquid crystal compound | Amount (parts by mass) | |
| --- | --- | --- |
| | Comparative Example | Example 4 |
| $H_7C_3$—⬡—⌬—O—$CF_2CF$=$CF_2$ | 33 | 33 |
| $H_5C_2$—⬡—⬡—⌬(F)—O—$CF_2CF$=$CF_2$ | 9 | 9 |
| $H_7C_3$—⬡—⬡—⌬(F)—O—$CF_2CF$=$CF_2$ | 13 | 13 |
| $H_7C_3$—⬡—⬡—⌬(F,F)—O—$CF_2CF$=$CF_2$ | 14 | 14 |
| $H_{11}C_5$—⬡—⬡—⌬(F,F)—O—$CF_2CF$=$CF_2$ | 7 | 7 |
| $H_7C_3$—⬡—⌬—⌬(F,F)—O—$CF_2CF$=$CF_2$ | 16 | 16 |
| $H_7C_3$—⌬—⌬(F)—$OCF_2$—O—$CF_2CF$=$CF_2$ (Comparative compound 2) | 8 | |

TABLE 3-continued

| | Amount (parts by mass) | |
|---|---|---|
| Liquid crystal compound | Comparative Example | Example 4 |
| 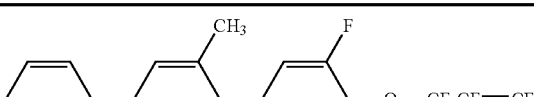 (Compound No. 1) | | 8 |
| $\Delta n$ | 0.097 | 0.101 |
| Low-temperature storage stability | −30 | −30 |
| $T_{N1}$ | 73.1 | 79.8 |
| $\Delta \epsilon$ | 4.9 | 5.1 |

$\Delta n$: optical (refractive index) anisotropy (25° C., 589 nm)
Low-temperature storage stability: the lowest temperature at which no change was observed in a screw vial for 2 weeks. Unit: [° C.]
$T_{N1}$: phase transition temperature from nematic to isotropic. Unit: [° C.]
$\Delta \epsilon$: dielectric anisotropy (25° C., 1 kHz)

As is clear from Table 3, the liquid crystal composition containing the compound of the present invention shows larger values of the optical (refractive index) anisotropy ($\Delta n$) and dielectric anisotropy ($\Delta \epsilon$) in comparison to the liquid crystal composition containing the comparative compound. Also, the compound of the present invention, compared with the comparative compound 2, can improve the nematic-isotropic phase transition temperature significantly and can widen the temperature range of the liquid crystal phase, even though the degree of improvement in low-temperature storage stability is the same.

<Examples of Mixing Ratio>

Preferred examples of mixing ratios of the liquid crystal composition of the present invention are shown in [Table 4] to [Table 10].

In the Tables, R and R' represent $C_{1-8}$ saturated alkyl groups, which are not substituted with halogen atoms.

TABLE 4

| | Composition Example 1 | |
|---|---|---|
| Liquid crystal compound | Compound of the present invention | Amount (parts by mass) |
| (vinyl-Cy-Cy-R) | | 18 |
| (R-Cy-Ph-F) | | 7 |
| (R-Cy-Cy-Ph(F,F)) | | 22 |
| (R-Cy-Cy-Ph-OCF₃) | | 12 |

TABLE 4-continued

Composition Example 1

| Liquid crystal compound | Compound of the present invention | Amount (parts by mass) |
|---|---|---|
| R–[Cy]–[Cy]–[Ph(F,F)]–O–CF$_2$H | | 8 |
| R–[Cy]–[Ph]–[Ph(F,F)] | | 9 |
| R–[Cy]–[Ph(CH$_3$)]–[Ph(F)]–O–CF$_2$CF=CF$_2$ | No. 2 | 15 |
| R–[Cy]–[Cy]–CH$_2$CH$_2$–[Ph(F,F)] | | 9 |
| Total | | 100 |

TABLE 5

Composition Example 2

| Liquid crystal compound | Compound of the present invention | Amount (parts by mass) |
|---|---|---|
| R–[Cy]–[Cy]–R' | | 10 |
| CH$_2$=CH–[Cy]–[Cy]–R | | 15 |
| R–[Cy]–[Ph]–O–CF$_2$CF=CF$_2$ | | 12 |
| R–[Cy]–[Ph(F)]–O–CF$_2$CF=CF$_2$ | | 7 |
| R–[Cy]–[Ph]–[Ph]–R' | | 7 |
| CH$_2$=CH–[Cy]–[Cy]–[Ph]–R' | | 9 |

TABLE 5-continued

Composition Example 2

| Liquid crystal compound | Compound of the present invention | Amount (parts by mass) |
|---|---|---|
| R–[Cy]–[Cy]–[Ph(F)]–O–CF$_3$ | | 12 |
| R–[Cy]–[Cy]–[Ph(F,F)] | | 13 |
| R–[Cy]–[Ph]–[Ph(F,F)] | | 10 |
| R–[Ph]–[Ph(CH$_3$)]–[Ph(F,F)]–O–CF$_2$CF=CF$_2$ | No. 1 | 5 |
| Total | | 100 |

TABLE 6

Composition Example 3

| Liquid crystal compound | Compound of the present invention | Amount (parts by mass) |
|---|---|---|
| CH$_2$=CH–[Cy]–[Cy]–R | | 16 |
| R–[Cy]–[Ph]–O–R' | | 7 |
| CH$_2$=CH–[Cy]–[Cy]–[Ph]–R | | 6 |
| R–[Cy]–[Cy]–[Ph(F,F)] | | 15 |
| R–[Cy]–[Ph]–[Ph(F,F)] | | 7 |

TABLE 6-continued

Composition Example 3

| Liquid crystal compound | Compound of the present invention | Amount (parts by mass) |
|---|---|---|
| R–⬡–⬡–⌬(F)–O–CF₃ | | 11 |
| R–⬡–⬡–COO–⌬(F,F) | | 8 |
| R–⬡–⌬(F)–COO–⌬–O–CF₃ | | 6 |
| R–⬡–⌬–CF₂O–⌬(F,F,F) | | 9 |
| R–⬡–⬡–⌬(F,F)–O–CF₂CF=CF₂ | | 6 |
| R–⬡–⌬(CH₃)–⌬(F)–O–CF₂CF=CF₂ | No. 2 | 9 |
| Total | | 100 |

TABLE 7

Composition Example 4

| Liquid crystal compound | Compound of the present invention | Amount (parts by mass) |
|---|---|---|
| R–⬡–⬡–R′ | | 6 |
| CH₂=CH–⬡–⌬–R | | 13 |
| CH₂=CH–⬡–⬡–⌬–R | | 11 |

TABLE 7-continued
Composition Example 4
| Liquid crystal compound | Compound of the present invention | Amount (parts by mass) |
|---|---|---|
| 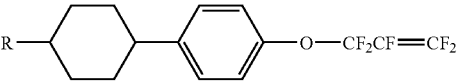 | | 17 |
| 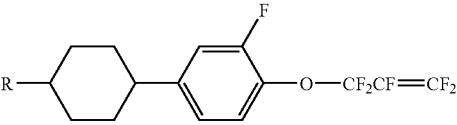 | | 8 |
| 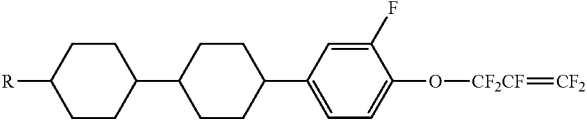 | | 7 |
| 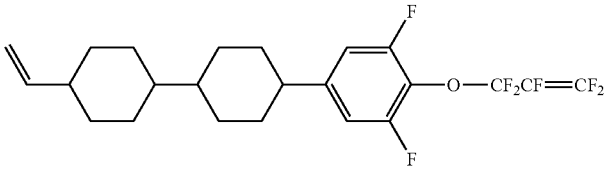 | | 15 |
| 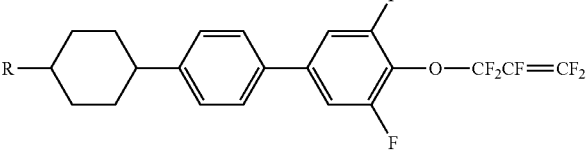 | | 7 |
| 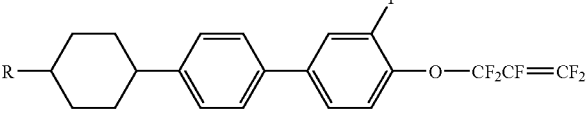 | | 11 |
| 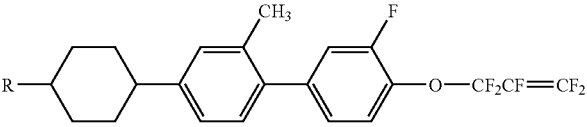 | No. 2 | 5 |
| Total | | 100 |
TABLE 8
Composition Example 5
| Liquid crystal compound | Compound of the present invention | Amount (parts by mass) |
|---|---|---|
| 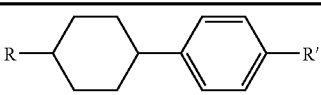 | | 8 |
| 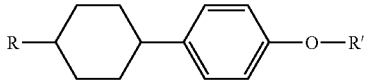 | | 18 |

TABLE 8-continued
Composition Example 5
| Liquid crystal compound | Compound of the present invention | Amount (parts by mass) |
|---|---|---|
| 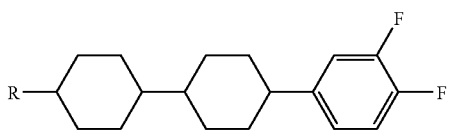 | | 27 |
| 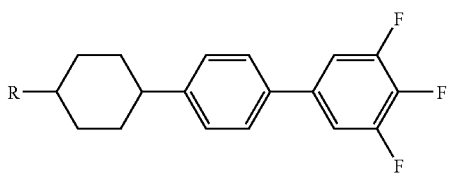 | | 9 |
| 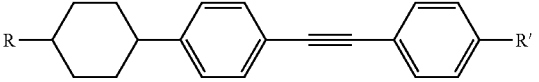 | | 5 |
| 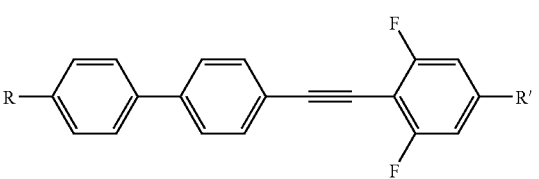 | | 4 |
| 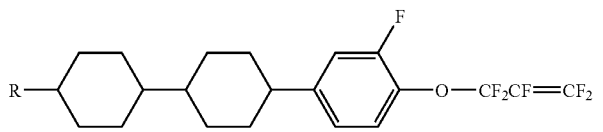 | | 18 |
| 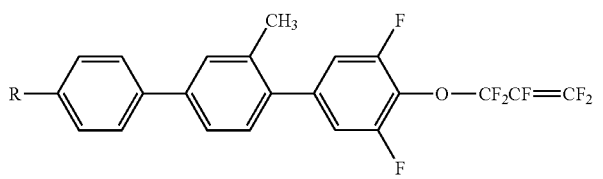 | No. 1 | 11 |
| Total | | 100 |
TABLE 9
Composition Example 6
| Liquid crystal compound | Compound of the present invention | Amount (parts by mass) |
|---|---|---|
|  | | 9 |
| 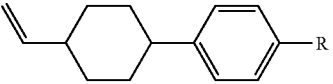 | | 18 |

TABLE 9-continued
Composition Example 6
| Liquid crystal compound | Compound of the present invention | Amount (parts by mass) |
|---|---|---|
| 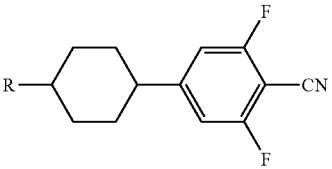 |  | 24 |
| 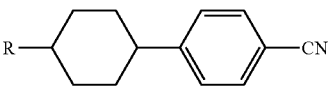 |  | 8 |
| 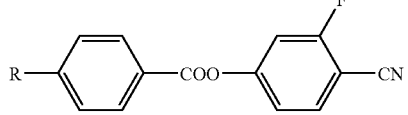 |  | 6 |
| 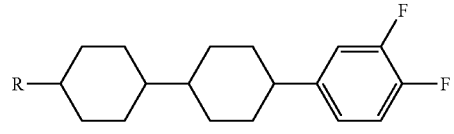 |  | 8 |
| 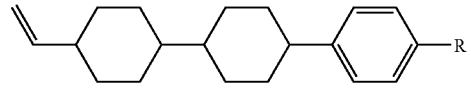 |  | 12 |
| 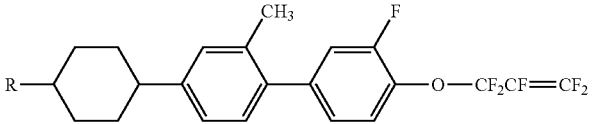 | No. 2 | 5 |
| 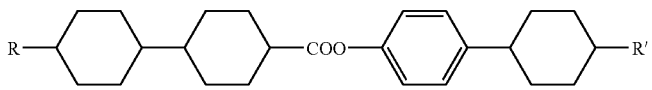 |  | 10 |
| Total |  | 100 |
TABLE 10
Composition Example 7
| Liquid crystal compound | Compound of the present invention | Amount (parts by mass) |
|---|---|---|
| 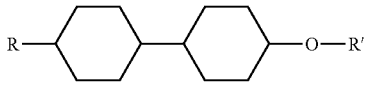 |  | 12 |
| 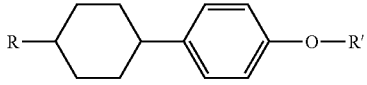 |  | 10 |
| 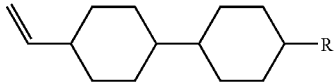 |  | 20 |

TABLE 10-continued

Composition Example 7

| Liquid crystal compound | Compound of the present invention | Amount (parts by mass) |
|---|---|---|
| 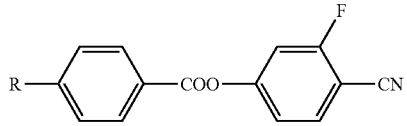 | | 26 |
| 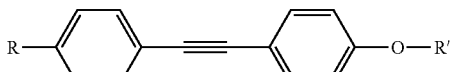 | | 5 |
| 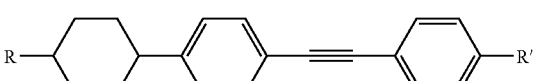 | | 11 |
| 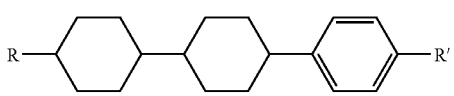 | | 8 |
| 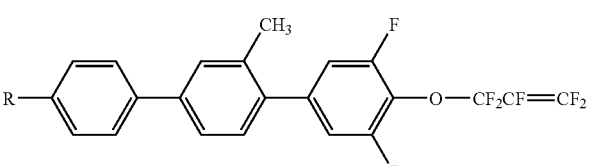 | No. 2 | 8 |
| Total | | 100 |

INDUSTRIAL APPLICABILITY

Liquid crystal compositions which comprise the compound of the present invention having side substituents has high optical (refractive index) anisotropy (Δn) and, therefore, can meet the demand for fast-response liquid crystal display elements. Further, the liquid crystal composition shows excellent low-temperature storage stability and exhibits a wide temperature range of liquid crystal phase.

The invention claimed is:

1. A compound represented by the general formula (II):

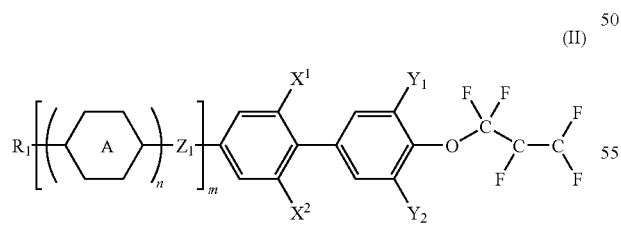

(II)

wherein $R_1$ is a hydrogen atom or an alkyl group having 1 to 8 carbon atoms, where the alkyl group may contain unsaturated bonds, any —$CH_2$— unit of the alkyl group may be replaced by —O—, —CO—, —COO—, or —$SiH_2$— and part or all of hydrogen atoms may be replaced by halogen atom or cyano group;

ring A is 1,4-phenylene (wherein —CH= may be replaced by —N=), unsubstituted 1,4-trans-cyclohexylene (wherein —$CH_2$— may be replaced by —O— or —S—), or 2,6-naphthylene group, and any hydrogen atom of ring A may be replaced by a halogen atom, a cyano, alkyl, or alkoxy group;

$Z_1$ is —COO—, —OCO—, —$CH_2$O—, —O$CH_2$—, —$CH_2CH_2$—, —CH=CH—, —C≡C—, or a single bond, and any hydrogen atom of $Z_1$ may be replaced by a fluorine atom;

m is 1 or 2 and when m is 2, ring A and $Z_1$ that are repeated may be different, respectively;

n is 0 or 1;

$X_1$ and $X_2$ are each independently alkyl or alkoxy group with 1 to 3 carbon atoms, or a hydrogen atom, where if either $X_1$ or $X_2$ is hydrogen, the other must not be hydrogen; and $Y_1$ and $Y_2$ are each independently a hydrogen, fluorine, or chlorine atom.

2. A liquid crystal composition comprising the compound according to claim 1.

3. An electro-optical display element, wherein a liquid crystal cell is filled with the liquid crystal composition according to claim 1.

* * * * *